United States Patent [19]

Godbois

[11] Patent Number: 4,509,636
[45] Date of Patent: Apr. 9, 1985

[54] DIVERTING ROLLER SYSTEM

[76] Inventor: Arthur G. Godbois, 2241 Avenue B, Grand Prairie, Tex. 75051

[21] Appl. No.: 514,449

[22] Filed: Jul. 18, 1983

[51] Int. Cl.³ ............................................. B65G 47/46
[52] U.S. Cl. ........................................ 198/372; 198/436
[58] Field of Search ............... 198/372, 370, 367, 436, 198/437, 787

[56] References Cited

U.S. PATENT DOCUMENTS

| | | | |
|---|---|---|---|
| 2,624,445 | 1/1953 | Wallman | 198/787 |
| 3,058,565 | 10/1962 | Byrnes | 198/367 X |
| 3,138,238 | 6/1964 | Degood et al. | 198/362 |
| 3,983,988 | 10/1976 | Maxted et al. | 198/367 X |
| 4,180,150 | 12/1979 | Moore | 198/787 X |
| 4,328,889 | 5/1982 | Maxted | 198/367 |

Primary Examiner—Joseph E. Valenza
Assistant Examiner—Jonathan D. Holmes
Attorney, Agent, or Firm—Stanley R. Moore; Thomas L. Crisman

[57] ABSTRACT

Apparatus for selectively diverting articles carried by a conveyor roller system of the type utilizing a field of rollers mounted for rotation upon an underlying drive belt. An angulated transfer roller is rotatably mounted between existing rollers in the field and powered by an aligned drive roller in frictional engagement with the drive belt. The drive roller is mounted and aligned in generally parallel spaced relationship relative to the adjacent rollers of the field. The angular orientation of the transfer, or diverting roller, is provided by a generally "Y" shaped housing. This configuration permits the diverting roller to be angulated and selectively upstand through the notional plane of conveyance of the field of rollers by rotation of the housing. In this position, the angulated transfer roller engages an article passing therethrough. Such a diverting roller system may be incorporated into an existing roller field while utilizing the underlying drive system and may be remotely actuated by conventional actuation linkage.

10 Claims, 4 Drawing Figures

DIVERTING ROLLER SYSTEM

BACKGROUND OF THE INVENTION

1. Field of the Invention

The present invention relates to conveyor apparatus, and more particularly, to a diverting roller system comprising a roller transfer station disposed within a field of rollers and adapted for transfering an article carried thereon into a relatively angular direction.

2. History of the Prior Art

The prior art is replete with conveyor roller systems utilized for conveying articles such as luggage, parcels, cartons and package items. Such systems are utilized in warehouses, factories, and commercial distribution organizations such as the post office. For controlled routing and delivery of the articles being conveyed, it is frequently necessary to transfer them at an angle onto still another conveyor or roller system. The transfer, or diverting, is often selectively necessary as in conveyor systems used in routing articles onto intersecting conveyor lines in response to the designation of the particular article.

Numerous prior art designs have been utilized for angularly diverting articles conveyed upon a roller system. Prior mechanical devices for diverting have been shown to be unreliable, expensive to build and, in many instances, expensive to operate. Moreover, it has generally been difficult to implement a diverting system into an existing roller or conveyor system without extensive modification. Structural and functional considerations contribute to this difficulty. The primary functional aspect of a diverting system is the power drive of the diverting rollers. Because the articles being conveyed are often heavy, a "passive" diverting roller, that is one without an independent drive, will often simply become an impediment to further motion of the article upon the conveyor system. The capacity to move the article sideways at a fixed angle, which is often a right angle, requires the ability to turn the article upon its vertical axis and change the horizontal orientation so that one side can be turned to face a desired direction each time a transfer is made. This step generally requires a driving transfer roller in engagement with the article.

Power trains for diverting rollers have been constructed in a myriad of configurations. Drive chains, gears, and related transmission devices have, for example, been utilized. The mechanical complexity of such diverting stations is one contributing factor to the inherent unreliability and expense thereof. For these reasons, numerous inventive steps have been taken in the prior art to overcome certain of the aforesaid disadvantages. For example, U.S. Pat. No. 4,180,150 dated Dec. 25, 1979, was issued for a "Multi-Directional Transfer Device". The transfer station set forth therein includes at least three single, tilted wheels that are driveable and also steerable in a horizontal plane. The wheels are intended to impart the desired thrust vectors for horizontal, linear, and rotational movement of an article carried by the conveyor system. Steering is provided by a chain and sprocket mechanism while roller rotation is accomplished through a belt 22 and gear motor 23. Such mechanisms are useful in diverting articles upon the conveyor system but require independent drive means.

Other prior art transfer embodiments incorporate diverter mechanisms having live roller conveyors in which the diverter wheels are positively powered by the drive belt of the conveyor. One such apparatus is set forth in U.S. Pat. No. 3,138,238 issued June 23, 1964, for a "Powered Diverter". The apparatus set forth therein includes a simple diverter mechanism which may be installed on any standard conveyor line without substantial structural modifications and which incorporates a positive drive of the diverter roller. It is advantageous to incorporate a construction fully compatible with standard live roller conveyor systems which do not require extensive structural changes. As set forth in that U.S. Pat. No. 3,138,238, the diverter wheels are powered by the main conveyor belt itself with the same tangential velocity as the carrier roller of the main conveyor. This design aspect prevents slippage of the articles on the diverter wheels. Such features are important for assuring positive and accurate turning of the article so that it is transferred on to the intersecting conveyor in an exactly centered position. The positive belt drive of this prior art structure also eliminates the necessity for a separate transmission system since the diverting rollers are driven directly by the underlying belt.

Prior art belt driven roller systems often reduce the complexity and cost of the assembly and improve reliability by elimination of complex mechanical linkages. However, the problem of abnormal belt wear, abrasion, and frictional deterioration between the rollers and the belt is particularly a problem with diverter rollers. Because the diverter must orient its rolling surface at an angle relative to the belt, deleterious drag and wear is often imparted to the belt which reduces severely the system life and overall reliability. Belt drag and deterioration as well as positive drive requirements may thus be seen to be one underlying reason for incorporation of positive drive means such as belts, gear, and other transmission apparatus incorporated by the prior art. It would be an advantage, however, to provide a diverting mechanism incorporating the advantageous features of conveyor belt driven diverting rollers without the deleterious results and/or complex and costly mechanical assemblies generally found in prior art apparatus.

The method and apparatus of the present invention overcome the problems of the prior art by providing a diverting roller system incorporating an aligned drive roller and reciprocally mounted diverting roller. The diverting roller is designed for entry into and from the notional plane of conveyance while being positively driven from the underlying drive roller engaging the conveyor belt in axially aligned rotational engagement. The diverter roller of the present invention is angularly mounted relative to the belt drive powering roller which maintains its positive, aligned engagement with the conveyor belt. In this manner, the diverting roller may be selectively actuated for entry into the notional plane of conveyance for diverting articles passing therethrough.

SUMMARY OF THE INVENTION

The present invention relates to a diverting roller system for a belt driven roller assembly. More particularly, one aspect of the invention comprises apparatus for selectively diverting articles from a conveyor system of the type comprising a plurality of roller elements disposed in generally parallel spaced relation defining a notional plane of conveyance. The rollers are disposed upon an underlying drive member imparting a rotational motion to the rollers. The diverting apparatus comprises an elongate housing adapted for mounting between adjacent rollers of the conveyor system and atop the drive member where diverting of articles is to be effected. The housing is constructed in a generally "Y" shaped configuration including a linear body section and an angularly extending arm. At least one drive roller is rotatably mounted upon the linear body section in generally parallel spaced relationship with the adjacent rollers. A diverting roller is rotatably mounted upon the angularly extending arm and means are provided for coupling the drive roller and the diverting rollers. Means are also provided for mounting and rotating the "Y" shaped housing about the linear body section for moving the diverting roller into and out of the notional plane of conveyance for diverting articles.

In yet another embodiment, the apparatus includes means coupling the drive roller and the diverting roller in the form of a flex cable. The rollers are rotationally mounted upon the "Y" shaped housing for rotational movement relative thereto through the cable. The means for rotating the "Y" shaped housing also includes mechanical linkage connected to the housing and extending therefrom in connection with motion actuation means for rotating the housing in response to a signal. The rollers preferably include an outer frictional surface for positive engagement of the underlying drive member and the article to be diverted. The drive roller may also be constructed of a diameter less than that of the adjacent conveyor rollers for imparting a rotational velocity to the diverting roller greater than the rotational velocity of the adjacent conveyor roller. The underlying drive member preferably comprises a conveyor drive belt.

In yet another embodiment, the invention includes an improved diverting roller system for a conveyor roller assembly of the type wherein a field of conveyor rollers are mounted in generally parallel spaced relationship and driven by an underlying drive member for the conveyance of articles thereupon. A diverting roller system is disposed between adjacent rollers within the field of rollers and is mounted for selectively upstanding therefrom into the notional plane of conveyance. The notional plane is defined by the top of the field of rollers. The improvement comprises a generally "Y" shaped housing disposed between the adjacent rollers. The "Y" shaped housing includes a central linear section mounted in generally spaced parallel relationship with the adjacent rollers. An angularly extending arm is formed outwardly therefrom. At least one drive roller is mounted upon the elongate housing member in rotational engagement with the underlying drive member. A diverting roller is mounted upon the angularly extending arm. Means are provided for coupling the drive roller and the diverting roller through the housing. Means are provided for mounting and rotating the housing along the axis of the linear housing section. This step arcuately rotates the diverting roller upwardly into the notional plane of conveyance for engagement with articles passing therethrough.

BRIEF DESCRIPTION OF THE DRAWINGS

For a more complete understanding of the present invention and for further objects and advantages thereof, reference may now be had to the following description taken in conjunction with the accompanying drawing in which.

DETAILED DESCRIPTION

Figure 1:
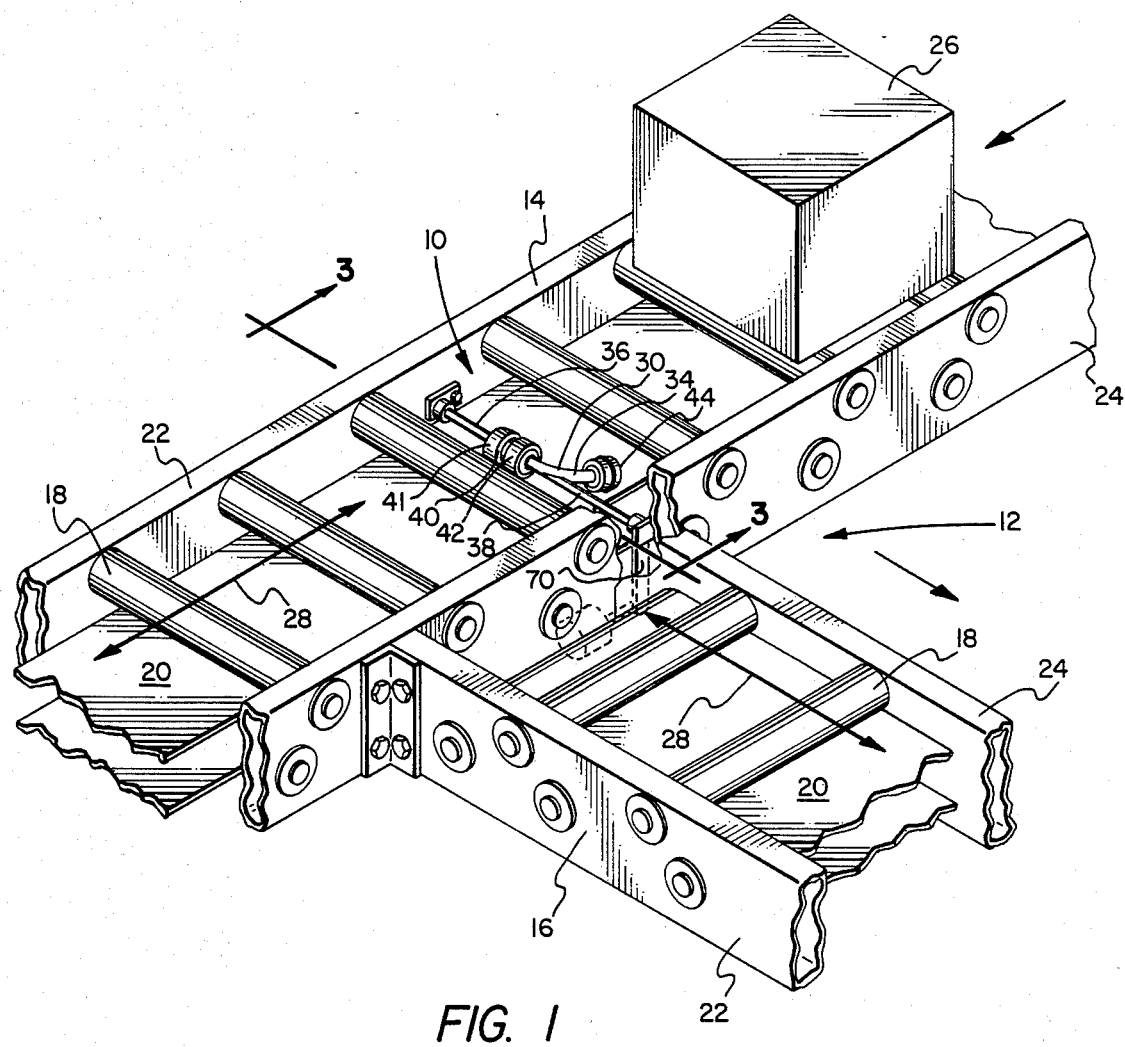
FIG. 1 is a perspective view of one embodiment of a diverting roller system constructed in accordance with the principles of the present invention.

Referring first to FIG. 1, there is shown a perspective view of a diverter roller system 10 constructed in accordance with the principles of the present invention. The system 10 is incorporated into a conventional conveyor network 12 comprising a first conveyor line 14 and an intersecting conveyor line 16. The diverting roller system 10 is disposed at the intersection of conveyor lines 14 and 16 for selectively diverting an article carried thereon from one line to the other.

Conveyor lines 14 and 16 are of conventional construction, comprising a field of rollers 18 disposed in generally parallel spaced relationship atop an underlying drive belt 20. The field of rollers 18 of each line are rotatably mounted between side frames 22 and 24 defining each conveyor line 14 and 16. The drive belts 20 are driven by conventional power means such as electric motors (not shown) for imparting rotation to the rollers resting thereon. An article 26 such as the container shown herein, is propelled down the conveyor line 14 atop the field of rollers by the rotation of the individual rollers 18 thereunder. The article travels in a direction opposite to that of the motion of the conveyor belt. The speed of the conveyor belt determines the speed of the article which lies within the notional plane 28 defined by the top of each roller 18 which engages the conveyed article.

Still referring to FIG. 1, the diverting roller system 10 comprises a generally "Y" shaped support housing 30 which is rotatably mounted between the side frames 22 and 24. The housing 30 is preferably of a hollow construction formed from tubular steel or the like and shaped into the "Y" configuration by conventional metal forming techniques, with angular member 34 intersecting linear mounting member 38. A separate mounting member comprising shaft 36 also formed of tubular steel or the like is provided for mounting the housing 30 to sidewall 22. The shafts 36 and 38 are preferably mounted to one another between frame members 22 and 24 in axial alignment. The angular member 34 extending from shaft 38 is preferably formed of unitary construction with a lower, bearing mounting section aligned in axial alignment with shaft 36. In this manner, the passage between the lower bearing section and the angular member 34 of the housing 30 is smooth and continuous and adapted for the housing of a flexible drive cable therein.

Still referring to FIG. 1, a plurality of rollers are utilized to comprise the diverting roller system 10. At least one drive roller is disposed in rotational engagement with the underlying belt 20 for being driven thereby. In the present embodiment, a drive roller 40 is formed with two roller sections 41 and 42. The roller sections 41 and 42 are mounted for rotation upon the ends of left and right shafts 36 and 38, respectively. A diverting roller 44 is rotatably mounted upon the end of the angled member 34 of housing 30 and rotates in response to the drive roller 40. In this manner, one or more diverting roller system 10 can be positioned between existing rollers 18 of a field of rollers in a conveyor system for select diverting of articles conveyed thereon. It should be noted that a "Y" shaped housing 30 could be mounted on both sides of roller 40 in place of shaft 36, for bi-directional diverting.

Figure 2:
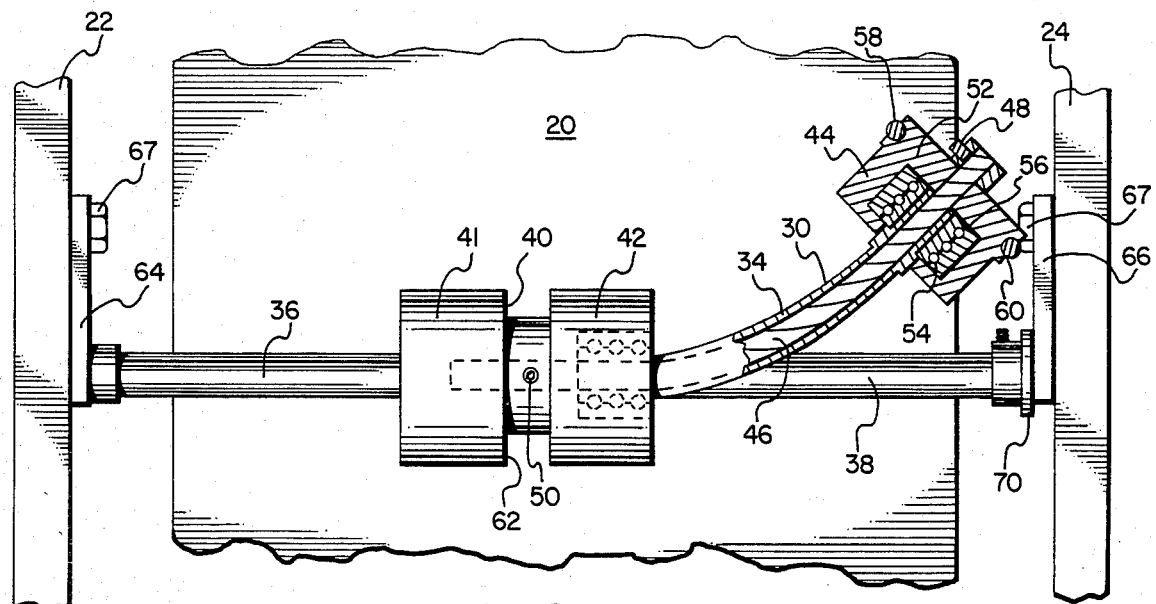
FIG 2 is a top plan, enlarged fragmentary, cutaway view of the roller system of FIG. 1 illustrating the drive train thereof.

Referring now to FIG. 2, there is shown a top plan enlarged view of the diverting roller system 10 of the present invention, showing one housing 30 mounted therein. The system 10 is shown with a section of the "Y" shaped housing 30 cut away for purposes of illustrating the assembly and the operation thereof. It may be seen that "Y" shaped housing sections 34 and 38 integrate into one another in the area of the lower bearing section as set forth above. In the present embodiment, the diverting roller 44 is continuously driven by the drive roller 40 through a flex cable 46 disposed therebetween and rotationally coupling said rollers within the housing 30. The linear housing section 38 and mounting shaft 36 may be seen to permit rotation of the roller 40 and the housing 30 between side frames 22 and 24.

Still referring to FIG. 2, the flex cable 46 is shown in cut away elevation to illustrate its connection between diverting roller 44 and driving roller 40. A pair of set screws 48 and 50 secure the rollers 44 and 40, respectively, to opposite ends of the cable 46. In this manner, movement of the belt 20 in engagement with the roller 40 imparts rotation directly to the roller 44 for select diverting of articles. The roller 44 is constructed of a generally cylindrical body 52 having a bearing 54 mounted therein for providing rotation upon the end of the angled shaft member 34. The rotating cable 46 therein is thus permitted to impart rotation relative to the rotationally stationary shaft 34. The roller bearing 54 as shown in FIG. 2 may be seen to be constructed for securement within a central aperture 56 of the body 52 of roller 44. A frictional surface is preferably provided about an outer surface of the roller 44 for frictionally engaging and diverting articles. In the present embodiment, an O-ring 58 is shown positioned within a circumferential groove 60 formed within the outer surface of the cylindrical roller 44. The O-ring provides both a cushioning and frictional engagement surface for maximizing diverting roller efficiency in the present configuration. It should be noted that any number of frictional surface configurations may be utilized in the diverting roller.

Still referring to FIG. 2, the driving roller 40 is of a bifurcated design, constructed with a central necked portion 62 shown receiving the set screw 50 engaging the drive cable 46 therein. Such a configuration is but one embodiment of the drive roller 40 which is preferably constructed in a cylindrical configuration with a coating therearound having a high coefficient friction. It should also be noted that any number of drive rollers may be utilized for a diverting roller assembly 10. Various drive roller configurations may also be necessitated due to the magnitude of frictional drive forces required by the type of article being diverted. In the present invention, a single bifurcated roller 40 having separate belt engaging surfaces is shown for purposes of illustration.

Also shown in FIG. 2 are opposite side mounting arms 64 and 66 secured to side frames 22 and 24 by conventional bolt members 67. The side frame arms are utilized for positionally securing the "Y" shaped housing 30 within the field of rollers and permitting the select rotation thereof for arcuate movement of the diverting roller 44. In the present embodiment, acutation linkage 70 is shown positioned to the right side of the housing 30 inwardly of the mounting arm 64. Actuation of the linkage 70 provides rotation of the housing 30 and angled arm 34 in a manner described in more detail below.

Figure 3:
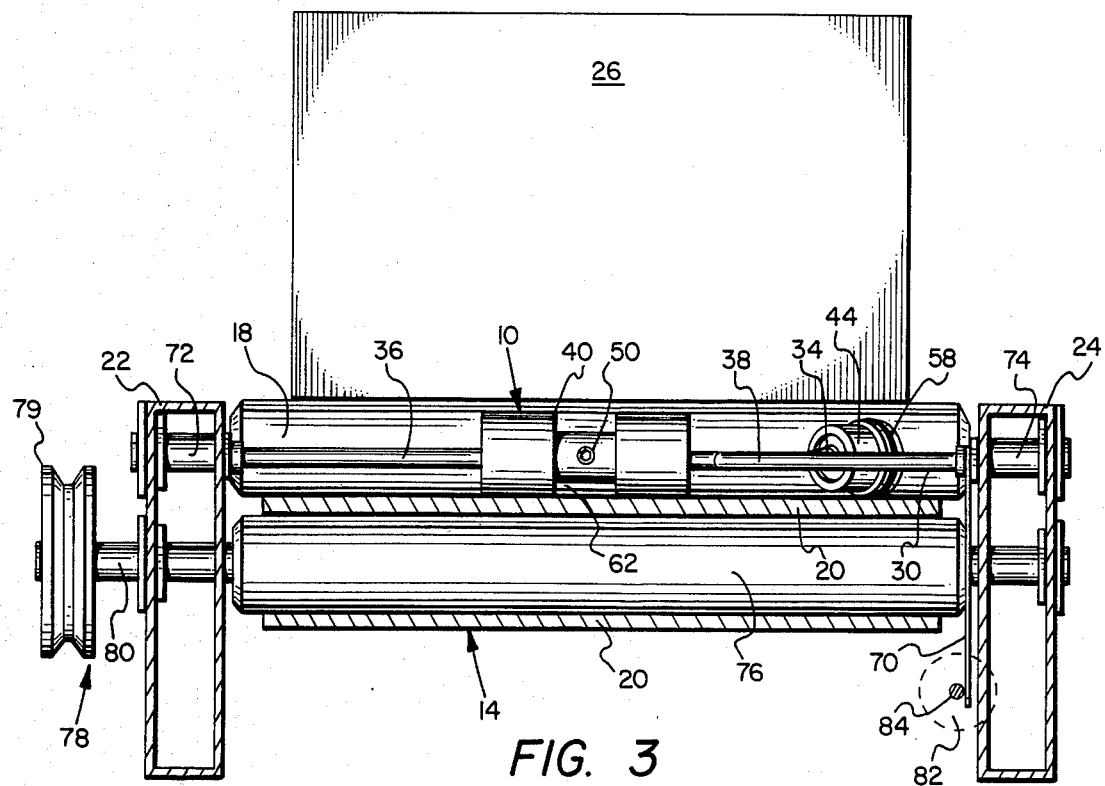
FIG. 3 is an end view of the roller system of FIG. 1 taken along lines 3—3 thereof.

Referring now to FIG. 3, there is shown an end-elevational cross-sectional view of a portion of the conveyor line 14 incorporating the present invention. The diverting roller assembly 10 is shown secured between side frame members 22 and 24 atop drive belt 20. A roller 18 is shown disposed adjacent to the diverting roller assembly 10 and with an article 26 to be diverted thereon. In the present illustration, the diverting roller 44 is shown in the passive or down position where it does not intersect the notional plane of conveyance 28 or engage either the drive belt 20 or the articles carried thereabove. It may be seen that the housing 30 is rotationally mounted through the side frames 22 and 24 by conventional bearing assemblies 72 and 74, respectively, providing rotational stability and securement of the housing 30 between said side frames. The conveyor belt 20 is likewise mounted, in the present embodiment, relative to an underlying drive roller 76.

Still referring to FIG. 3, the particular conveyor belt 20, as shown herein, is driven by a suitable power means which, in the present embodiment, is illustrated by drive roller 76 and pulley assembly 78. A pulley 79 is disposed outwardly of a drive shaft 80 extending through side frames 22 and 24. The drive roller 76 secured thereon engages at least one side of the conveyor belt 20 for imparting select conveyance motion thereto. The drive pulley may be disposed at any point along the belt or at opposite ends thereof. Moreover, any number of drive rollers may be incorporated as is conventional within the prior art of conveyor and, particularly, belt driven roller conveyor systems. It should be noted that in the present invention, however, the conventional conveyor roller line incorporates the diverting roller assembly 10 without substantial alteration to the existing assembly. Actuation of the assembly 10 is effected by the actuation linkage 70 depending from the linear section 38 of the housing 30 as best shown in FIG. 3. Linkage 70 is connected to an actuation solenoid 82 (shown in phantom) by a coupling linkage 84. It should be noted, however, that any number of actuation mechanisms, including manual levers, may be incorporated in accordance with the principles of the present invention. The actuation linkage or mechanism may, of course, be of simple industrial design, such as pneumatic, hydraulic, or electric, for effecting rotation of the generally "Y" shaped housing 30 and the necessary arcuate motion of the angulated diverting roller 44 into the notional plane of conveyance.

Figure 4:
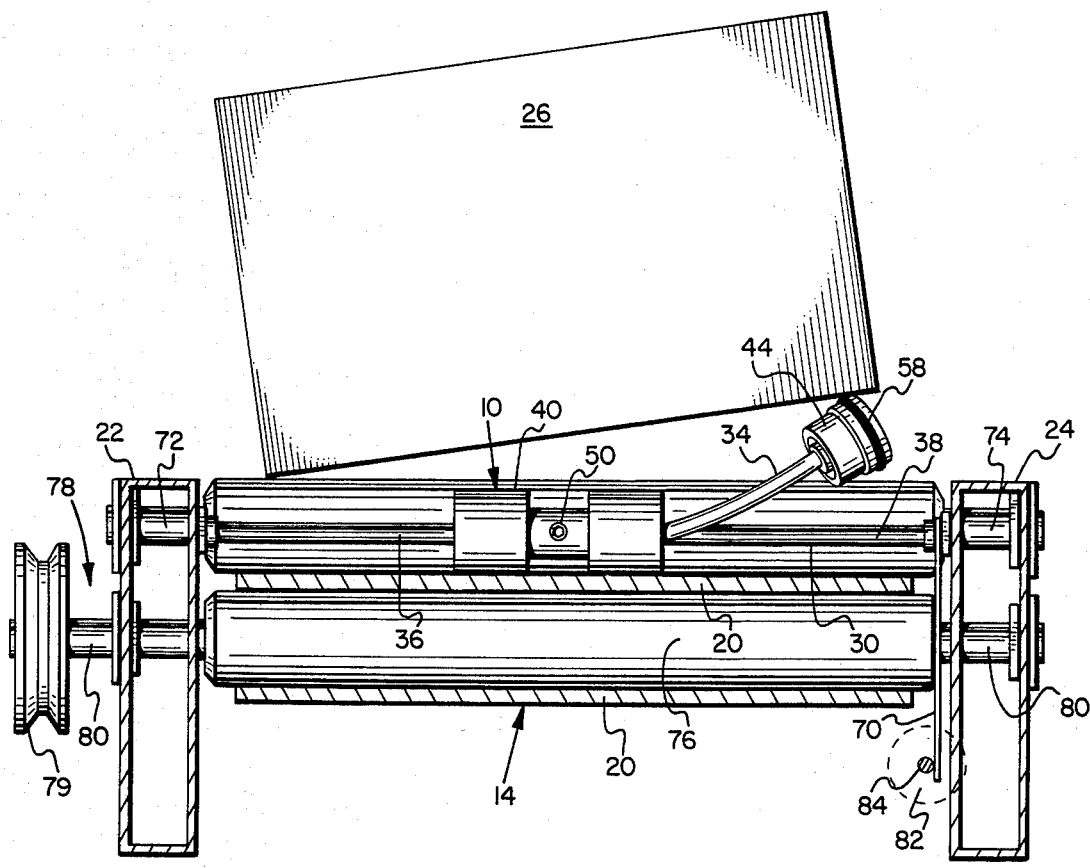
FIG. 4 is an end view of the roller system of FIG. 3 illustrating engagement with an article being conveyed.

Referring now to FIG. 4, there is shown the diverting roller assembly 10 in position for diverting an article 26 upon the roller line 14. As shown in FIG. 4, the actuation linkage 70 has been rotated or moved to impart rotation to the section 38 of the housing 30. It should be noted that rotation of section 38 is independent of section 36 upon which drive roller 40 is allowed to rotate. The rotation of section 36 causes the diverting roller 44 to rise through the notional plane 28 where it engages the article 26 being carried therethrough. The article 26 is brought into contact with the resilient frictional drive surface, comprising O'ring 58 of the roller 44 and raised upwardly across one end and driven thereby through rotation of the roller 44. In this manner, the article 26 is selectively diverted to a location off of the conveyor line. Drive roller 40 is preferably of smaller diameter than adjacent rollers 18 so that a greater rotational velocity is imparted to diverting roller 44. In this manner, a more positive diverting action can be produced.

Referring to FIGS. 1 and 4 in combination, it may be seen that actuation of the diverting roller assembly 10 will cause diverting of an article 26 onto an adjacent and intersecting area or conveyor line 16. The line 16 may be oriented at any angle including orthogonally disposed to primary conveyor line 14. After diverting action, actuation linkage 70 may be returned to its passive, or "down", position whereby subsequent passage of articles upon the conveyor line 14 will proceed without interruption.

In operation, a variety of actuation mechanisms may be utilized to selectively impart the diverting activity to the conveyor line. The actuation mechanism 82, (shown generally in phantom), is preferably of an electrical, hydraulic, or pneumatic solenoid variety which may be easily installed in an existing conveyor line. A manual lever may also be used. In this manner, the diverting roller assembly 10, including the actuation mechanism, can be used to retrofit any existing conveyor line where the addition of an intersecting line or article transfer station is deemed necessary. The roller assembly 10, as set forth above, may also be disposed between existing rollers 18 without effecting the functioning thereof or modifying the operation of the conveyor line.

Still referring to FIGS. 1 and 4 in combination, it may be seen that during the operation of the diverting roller 44 all rolling surfaces are in aligned, frictional engagement. This feature eliminates the deleterious abrasion and drag often associated with prior art belt drive diverting roller systems. It may also be seen that a plurality of diverting rollers 44 may be disposed upon the angled arm of the housing 30 where such a design aspect is deemed necessary for the angle or type of articles being conveyed.

It is thus believed that the operation and construction of the present invention will be apparent from the foregoing description. While the method and apparatus shown and described has been characterized as being preferred, it will be obvious that various changes and modifications may be made therein without departing from the spirit and scope of the invention as defined in the following claims.

I claim:

1. An apparatus for selectively diverting articles carried by a conveyor system of the type comprising a plurality of roller elements disposed in generally parallel spaced relationship defining a notional plane of conveyance and disposed upon an underlying drive member imparting a rotational motion to the rollers, wherein the diverting apparatus comprises:
   an elongate housing adapted for mounting between adjacent rollers of said conveyor system and atop said drive member at a location where diverting of articles is to be effected, said housing comprising a generally "Y" shaped configuration including a linear body section and an angularly extending arm;
   at least one drive roller rotatably mounted upon said linear body section in generally parallel spaced relationship with said adjacent rollers;
   a diverting roller rotatably mounted upon said angularly extending arm;
   means coupling said drive roller and said diverting roller for generally concomittant rotation; and
   means for selectively rotating said "Y" shaped housing about said linear body section for moving said diverting roller into and out of said notional plane of conveyance for diverting articles.

2. The apparatus as set forth in claim 1 wherein said means coupling said drive roller and said diverting roller comprises a flex cable and wherein said rollers are rotationally mounted upon said "Y" shaped housing for rotational movement relative thereto.

3. The apparatus as set forth in claim 1 wherein said means for rotating said "Y" shaped housing includes mechanical linkage connected to said housing and extending therefrom in connection with motion actuation means for rotating said housing in response to a signal.

4. The apparatus as set forth in claim 1 wherein said rollers include outer surfaces adapted for positive, frictional engagement of said underlying drive member and said article to be diverted.

5. The apparatus as set forth in claim 1 wherein said drive roller is constructed of a diameter less than that of said adjacent conveyor rollers for imparting a rotational velocity to said diverting roller greater than the rotational velocity of said adjacent conveyor roller.

6. The apparatus as set forth in claim 1 wherein said underlying drive member comprises a conveyor drive belt.

7. An improved diverting roller system for a conveyor roller assembly of the type wherein a field of conveyor rollers is mounted in generally parallel, spaced relationship and driven by an underlying drive member for the conveyance of articles thereupon and wherein a diverting roller system is disposed between adjacent rollers within said field of rollers and mounted for selectively upstanding therefrom into the notional plane of conveyance defined by said field of rollers for the diverting of articles passing through said notional plane, wherein the improvement comprises a generally "Y" shaped housing disposed between said adjacent rollers, said "Y" shaped housing including a central linear section mounted in generally parallel spaced relationship with said adjacent rollers and a angularly extending arm formed outwardly therefrom; at least one drive roller mounted upon said elongate housing member in rotational engagement with said underlying drive member; a diverting roller mounted upon said angularly extending arm; means coupling said drive roller and said diverting roller through said housing; and means for rotating said housing along the axis of said linear housing section for arcuately rotating said diverting roller upwardly into said notional plane of conveyance for engagement with articles passing therethrough.

8. The apparatus as set forth in claim 7 wherein said diverting roller and said drive roller are coupled by a flex cable disposed within said housing, wherein rotation of said drive roller from said underlying drive member imparts direct rotation to said diverting roller.

9. The apparatus as set forth in claim 7 wherein said means for arcuately rotating said diverting roller includes a linkage arm secured to said elongate housing section and extending outwardly therefrom, said linkage being coupled to actuation means for moving said linkage in response to a signal wherein articles passing through said notional plane may be selectively diverted.

10. The apparatus as set forth in claim 7 wherein said underlying drive member comprises a conveyor drive belt.

* * * * *